(12) United States Patent
Allen et al.

(10) Patent No.: US 8,854,758 B2
(45) Date of Patent: Oct. 7, 2014

(54) TRACK DEFECT MAP FOR A DISK DRIVE DATA STORAGE SYSTEM

(75) Inventors: Walter Allen, Longmont, CO (US); Robert Alan Reid, Superior, CO (US)

(73) Assignee: AGERE Systems Inc., Allentown, PA (US)

( * ) Notice: Subject to any disclaimer, the term of this patent is extended or adjusted under 35 U.S.C. 154(b) by 2246 days.

(21) Appl. No.: 11/419,279

(22) Filed: May 19, 2006

(65) Prior Publication Data

US 2007/0053093 A1 Mar. 8, 2007

Related U.S. Application Data

(60) Provisional application No. 60/714,630, filed on Sep. 7, 2005.

(51) Int. Cl.
*G11B 5/09* (2006.01)
*G11B 20/18* (2006.01)

(52) U.S. Cl.
CPC .... *G11B 20/1833* (2013.01); *G11B 2020/1826* (2013.01); *G11B 2220/2516* (2013.01)
USPC ............... 360/53; 360/48; 360/75; 360/77.02

(58) Field of Classification Search
None
See application file for complete search history.

(56) References Cited

U.S. PATENT DOCUMENTS

| | | | | |
|---|---|---|---|---|
| 4,805,048 A * | 2/1989 | Takeuchi et al. | ................. | 360/69 |
| 4,903,198 A * | 2/1990 | Iwasaki | ............................. | 714/5 |
| 4,924,331 A * | 5/1990 | Robinson et al. | ............ | 360/72.1 |
| 5,075,804 A * | 12/1991 | Deyring | .......................... | 360/49 |
| 5,212,677 A * | 5/1993 | Shimote et al. | ............ | 369/53.17 |
| 5,237,553 A * | 8/1993 | Fukushima et al. | ....... | 369/53.17 |
| 5,271,018 A | 12/1993 | Chan | | |
| 5,367,652 A * | 11/1994 | Golden et al. | ..................... | 711/4 |
| 5,784,216 A * | 7/1998 | Zaharris | .......................... | 360/48 |
| 5,812,755 A * | 9/1998 | Kool et al. | ......................... | 714/8 |
| 5,937,435 A * | 8/1999 | Dobbek et al. | ................ | 711/202 |
| 6,025,966 A * | 2/2000 | Nemazie et al. | ................. | 360/53 |
| 6,101,619 A * | 8/2000 | Shin | ................................. | 714/710 |
| 6,134,143 A | 10/2000 | Norman | | |
| 6,201,655 B1 * | 3/2001 | Watanabe et al. | ................ | 360/53 |
| 6,295,176 B1 * | 9/2001 | Reddy et al. | .................... | 360/48 |
| 6,560,055 B1 * | 5/2003 | Nemazie et al. | ................. | 360/53 |
| 6,862,150 B1 | 3/2005 | Eto | | |
| 6,906,989 B2 * | 6/2005 | Furuhashi | ................. | 369/53.17 |
| 6,950,265 B2 * | 9/2005 | Hetzler et al. | ................... | 360/75 |
| 6,954,876 B2 * | 10/2005 | Ogawa et al. | ...................... | 714/8 |
| 2002/0108072 A1 * | 8/2002 | Beng Sim et al. | ................ | 714/5 |
| 2002/0133485 A1 * | 9/2002 | Furuhashi | ......................... | 707/3 |
| 2003/0123348 A1 * | 7/2003 | Ozaki | .......................... | 369/47.14 |
| 2003/0177434 A1 * | 9/2003 | Su et al. | ......................... | 714/768 |
| 2003/0237024 A1 * | 12/2003 | Ogawa et al. | ................... | 714/29 |
| 2004/0153845 A1 * | 8/2004 | Nam | ............................... | 714/42 |

* cited by examiner

Primary Examiner — Dismery Mercedes

(57) ABSTRACT

A method and apparatus for storing a disk drive media defect table or list. Defect table entries for a subject disk track are stored on the subject track and retrieved for determining defective sectors only when the subject track is accessed for a data read or write operation.

4 Claims, 5 Drawing Sheets

TRACK DEFECT MAP FOR A DISK DRIVE DATA STORAGE SYSTEM

This application claims the benefit of provisional patent application Ser. No. 60/714,630 filed on Sep. 7, 2005.

FIELD OF THE INVENTION

The present invention relates generally to disk drive data storage systems and more specifically to an apparatus and method for storing disk media defect information.

BACKGROUND OF THE INVENTION

Disk drive storage systems offer cost effective data storage for use with various electronic products and computer systems (referred to as host systems). As shown in FIG. 1, a disk drive 10 comprises a magnetic recording medium, in the form of a disk or platter 12 having a hub 13 and a magnetic read/write transducer 14, commonly referred to as a read/write head, for reading data stored on the disk 12 and writing (storing) data to the disk 12. The read/write head 14 is attached to or formed integrally with a suspension arm 15 suspended over the disk 12 and affixed to a rotary actuator arm 16. The actuator arm 16 is pivotably connected to a platform 20 at a pivot joint 22. A voice coil motor 24 drives the actuator arm 16 to position the head 14 over a selected position on the disk 12.

Although only a single disk 12 is illustrated in FIG. 1, a conventional disk drive system comprises a plurality of double-sided disks oriented in a stacked configuration, with one head servicing one side of each disk.

A typical disk drive as found in a host desk top computer is shown in FIG. 2. A hard disk controller 58, typically mounted on a circuit board 60 separate from the disk drive 10, comprises a servo controller 64 for controlling disk rotation and head positioning and a host interface 66 for receiving host data to be written and supplying read data to the host. In a read mode, a read/write channel 68 receives data read from the disk 12 by the head 14 via a preamplifier 69. The read data is buffered in a volatile buffer memory (controller RAM) 70. In the write mode, the buffer 70 supplies the data to be written to the read/write channel 68 and the preamplifier 69. The head 14 writes the data to the disk 12. In addition to temporarily storing read/write data, the buffer memory 70 also stores data for operating the disk drive 10. A processor 72 and its associated RAM 74, ROM 76 and flash memory 78 manage operation of the hard disk controller 58.

A surface of the disk 12 is divided into a plurality of concentric tracks. A track comprises user data fields (including error correction coding bytes), servo tracking fields and timing/synchronization fields. User data is read from and written to individual sectors during read and write operations. The sector is the smallest storage unit that can be written or read during a write or read operation.

The ability to store and read back information from the disk may be impaired by the presence of disk defects. Flaws or defects in the disk or media surface manifest themselves as bit errors, including missing bits or extra bits.

One common technique for avoiding bit errors performs a surface analysis or disk scan to create an error map of the disk surface. Typically performed during later stages of the disk drive manufacturing process, the disk scan detects and identifies media defects for the entire disk and generates a single ordered list (a global disk defect list, referred to as global because it stores defects for the entire disk) of the physical location of each defect. The defective media sites are avoided during operation of the disk drive to minimize data integrity problems. Since the defects are typically caused by scratches, blobs, finger prints and manufacturing material flaws the defective sectors tend to be closely spaced. The location of the defects and thus the global defect list varies significantly from drive to drive.

The global defect list is stored as a global defect table on the disk 10. Specifically, it is stored on reserved disk tracks that are not accessible to the user and therefore not available for storing data. These tracks may be referred to as "system tracks" or "negative tracks" to distinguish them from the data-storing tracks.

The processor 72 manages the defect list, relieving the host system of that burden, by executing an algorithm that scans the entire global defect list and manages the sector mapping in real time during read and write operations. Before executing a disk read or write operation, the entire global defect table is copied from the nonvolatile storage/memory (i.e., the disk) into the buffer memory 70. Using the buffered defect list, the processor 72 executes an algorithm that maps a logical data block address (an address used by the host data processing system when referring to data elements) to a known good sector physical data block address on the disk drive storage media. The shorter data access time of the buffer memory 70, compared with the nonvolatile storage/memory, speeds execution of the mapping algorithm, but the entire global defect list must be available in the RAM during the mapping process. It is known to pre-process the global defect list as it is loaded into the buffer memory 70 to reduce execution time of the mapping algorithm.

The disk drive data storage systems in desktop and laptop personal computers are physically larger than the small form-factor disk drives that are becoming increasingly popular in portable data processing devices, such as digital audio players, video recorders, digital cameras, cell phones, digital organizers and personal digital assistants. The disk drive in a desktop computer is about three inches in diameter. Currently, the small form-factor disk drives range between about 1.5 inches and 0.85 inches in diameter.

For a typical desktop disk drive, the hard disk controller 58 and its associated components are mounted on the separate printed circuit board 60 of FIG. 2. Due to the size of the desktop host computer, the board 60 provides sufficient area for a large discrete buffer memory 70 with sufficient capacity to store the global defect table without impacting the primary purpose of the buffer memory, i.e., to buffer the user data during read and write operations.

In state-of-the-art disk drives for consumer electronics products all hard disk controller components are fabricated on a single integrated circuit that includes a relatively small-capacity buffer memory 70, i.e., small compared with the buffer memory size of earlier generation disk drives and of desktop/laptop disk drives. FIG. 3 illustrates a printed circuit board 80 for a state-of-the-art small form-factor disk drive, comprising a hard disk drive controller integrated circuit 82, further comprising the hard disk drive controller elements described above. Due to the relatively small size of the buffer memory 70 within the integrated circuit 82, it may be necessary to allocate a sizable portion of this smaller memory capacity to the global defect table. Since the buffer also stores user data during read and write operations, allocating a large share of the buffer to the defect table degrades disk drive performance by slowing the data reading and writing processes.

For example, the buffer memory within one commercially available hard disk drive integrated circuit has a storage capacity of 380 KB. A defect table for a 12 GB disk drive can exceed 50 KB. Thus between about 10% and 15% of this buffer is occupied by the defect table. Since the buffer's primary purpose is buffering user data during read and write operations, a reduction in usable buffer space detrimentally impacts data transfer performance (a very important operating metric in the disk drive industry).

It is also observed that as disk drive size decreases (i.e., for use with portable data processing devices and consumer electronics devices) the number of manufacturing defects tends to increase, requiring a larger storage capacity for the global defect table. The two conflicting trends of more disk drive defects and smaller capacity buffers create design and operating challenges not present in the larger disk drive data storage systems.

Since no user data can be written to a defective sector, the data can be slipped to the next good sector. A difference between a physical location of the intended (defective) sector and the physical location where the data is stored, referred to as an offset, is stored in the defect table and for use in locating slipped data during a read operation. Instead of merely slipping the data to the next good sector, user data intended for a defective sector can be reallocated to a non-defective spare sector. To locate reallocated data the global defect table includes a pointer to the sector address where the data has been reallocated.

Previous attempts to address the issue of defect table storage capacity utilize zone-based defect tables that are smaller than the global defect table. But these tables may not be sufficiently small relative to the buffer size to avoid performance degradation. Also, zone-based tables require additional firmware to manage the multiple zone tables.

BRIEF SUMMARY OF THE INVENTION

In one embodiment, the present invention comprises a method for storing defect information for a disk of a disk drive data storage system. The method further comprises determining defect information for a region of the disk, storing the defect information in or proximate the region and using the defect information when accessing storage locations of the region for reading or writing data to the storage locations.

Another embodiment of the invention comprises a disk drive storage system for storing data. The system comprises a disk for storing data, the disk further comprises a plurality of data storage regions, each region further comprises a user data field for storing user data, a servo field and a region defect field for storing disk defect information for the region. The system further comprises a memory for storing the region defect field, wherein the region defect field is accessed from the memory prior to executing a read or a write operation to the disk.

BRIEF DESCRIPTION OF THE DRAWINGS

The present invention can be more easily understood and the advantages and uses thereof more readily apparent when the following detailed description of the present invention is read in conjunction with the figures wherein.

In accordance with common practice, the various described device features are not drawn to scale, but are drawn to emphasize specific features relevant to the invention. Like reference characters denote like features elements throughout the figures and text.

DETAILED DESCRIPTION OF THE INVENTION

Before describing in detail the particular method and apparatus according to the present invention, it should be observed that the present invention resides primarily in a novel and non-obvious combination of elements and process steps. Accordingly, so as not to obscure the disclosure with details that will be readily apparent to those skilled in the art having the benefit of the description herein, in the description that follows certain elements and process steps have been described with lesser detail, while the drawings and specification describe in greater detail other elements and steps pertinent to understanding the invention. The following embodiments are not intended to define limits as to the structure or use of the invention, but only to provide exemplary constructions. The embodiments are permissive rather than mandatory and illustrative rather than exhaustive.

Figure 1:
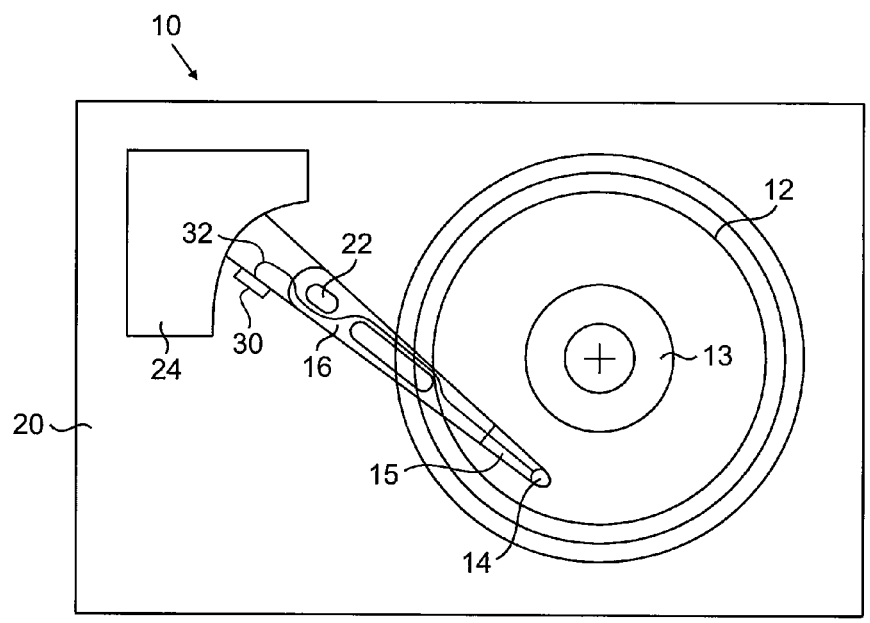
FIG. 1 illustrates a prior art disk drive data storage system to which the teachings of the present invention can be applied.
Figure 4:
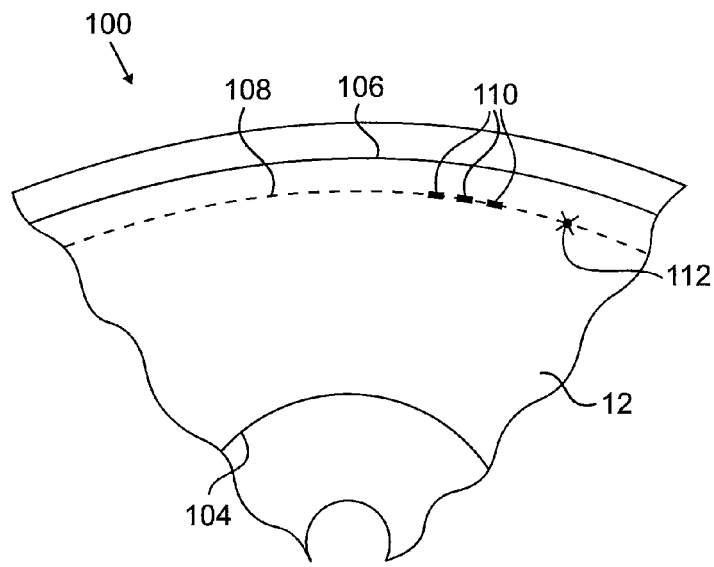
FIG. 4 is a plan view of a disk surface region of the disk drive data storage system of FIG. 1.

FIG. 4 is a partial plan view of a disk surface 100 of the disk 12 of FIG. 1, comprising data sites and including at least one defective data site. The disk surface 100 includes an inner boundary 104 and an outer boundary 106. Data is stored on concentric, circular tracks, indicated by a representative track depicted by a dashed line 108 between the inner boundary 104 and the outer boundary 106. User data from the host system is stored on the disk surface 100 in data sectors 110 (i.e., data sites). Each data sector typically stores 512 bytes of information. A defective sector 112 is also indicated. In the prior art, the global defect list includes the location of the defective sectors, including the defective sector 112.

According to the present invention, instead of creating and storing a global defect list on the system tracks of the disk, a defect list for each disk track is created and stored on that track, referred to as a track defect list. Furthermore instead of copying the global defect list into the buffer memory as required by the prior art, the present invention copies only the smaller track defect list into the buffer and only when that track is accessed. Creating the global defect list and storing it to the buffer is not required, since track defect information for tracks other than the track being accessed is superfluous. Thus the present invention reduces the amount of buffer memory required to store the defect table, freeing buffer capacity for buffering the user data during read and write operations. The present invention is especially suited for disk drive systems having a relatively small buffer memory, including disk drives having a buffer memory integrated with the processor as illustrated in FIG. 3.

Figure 5:
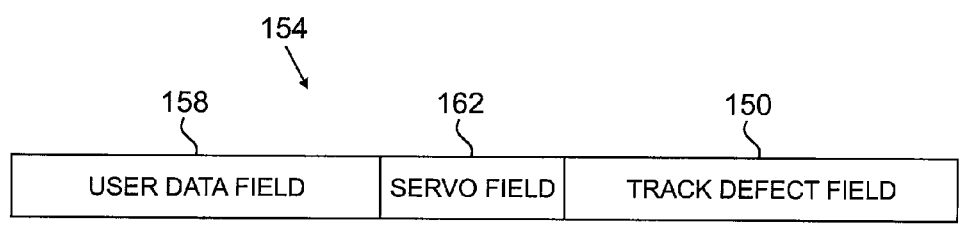
FIG. 5 is a representation of data stored on a track of a data storage disk.

To store the track defect table, the present invention adds at least one field (more than one field may be needed depending on the size of the track defect table) referred to as a track defect field 150, to each track, including a representative track 154 in FIG. 5. The track 154 further comprises a user data field 158 and a servo field 162. The track defect field 150 contains information identifying media defect location (if any) on the track 154 (i.e., defects in either the user data field 158 or the servo field 162) and preferably information required to locate data intended for storing at a defective sector.

Typically the track defect field 150 is relatively small, probably less than about 50 bytes and thus does not significantly reduce the track's capacity for storing user data. The track defect list is considerably smaller than the global or disk drive defect list, typically less than about 0.01% of the global defect list.

Figure 2:
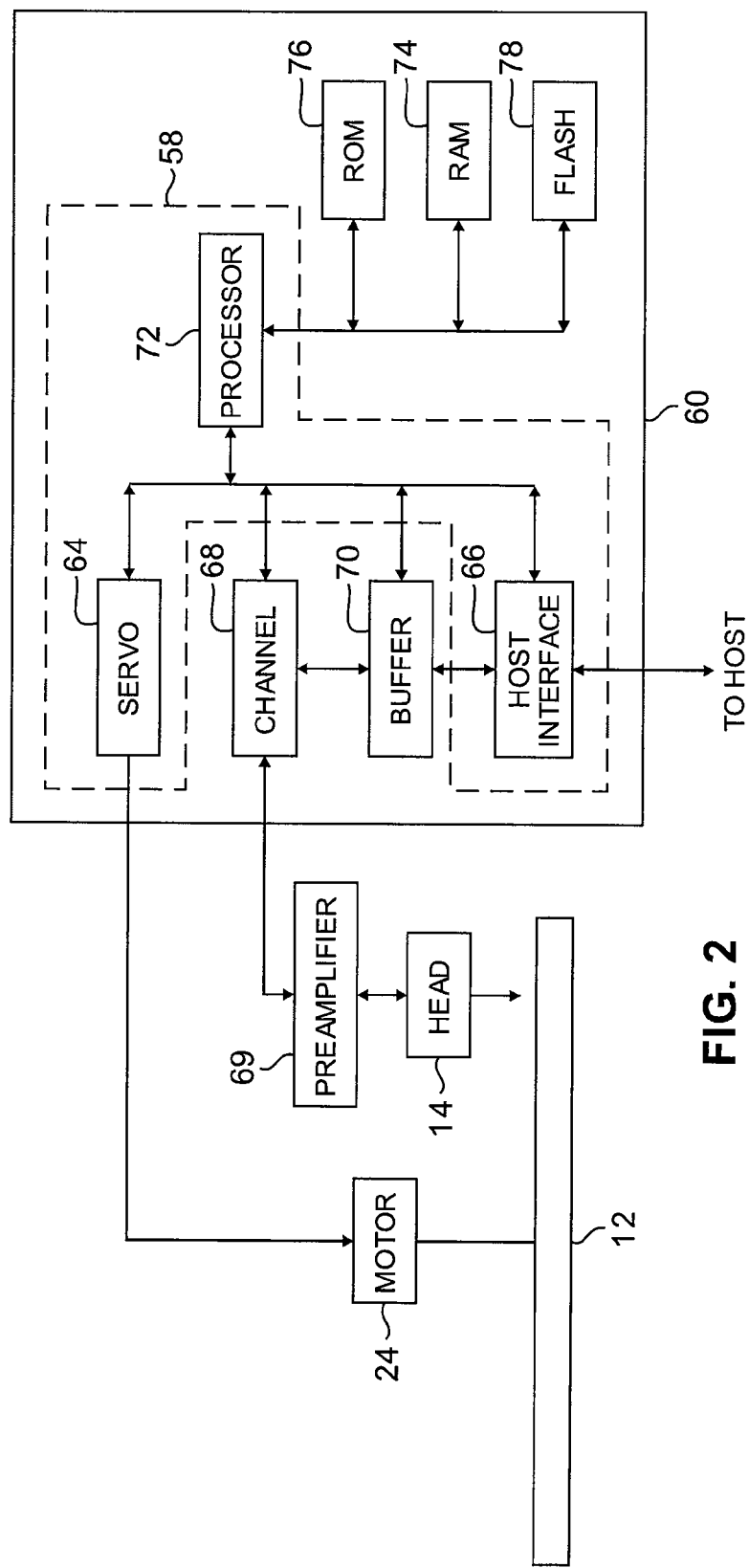
FIG. 2 is a partial schematic and partial block diagram of a prior art disk drive data storage system.
Figure 3:
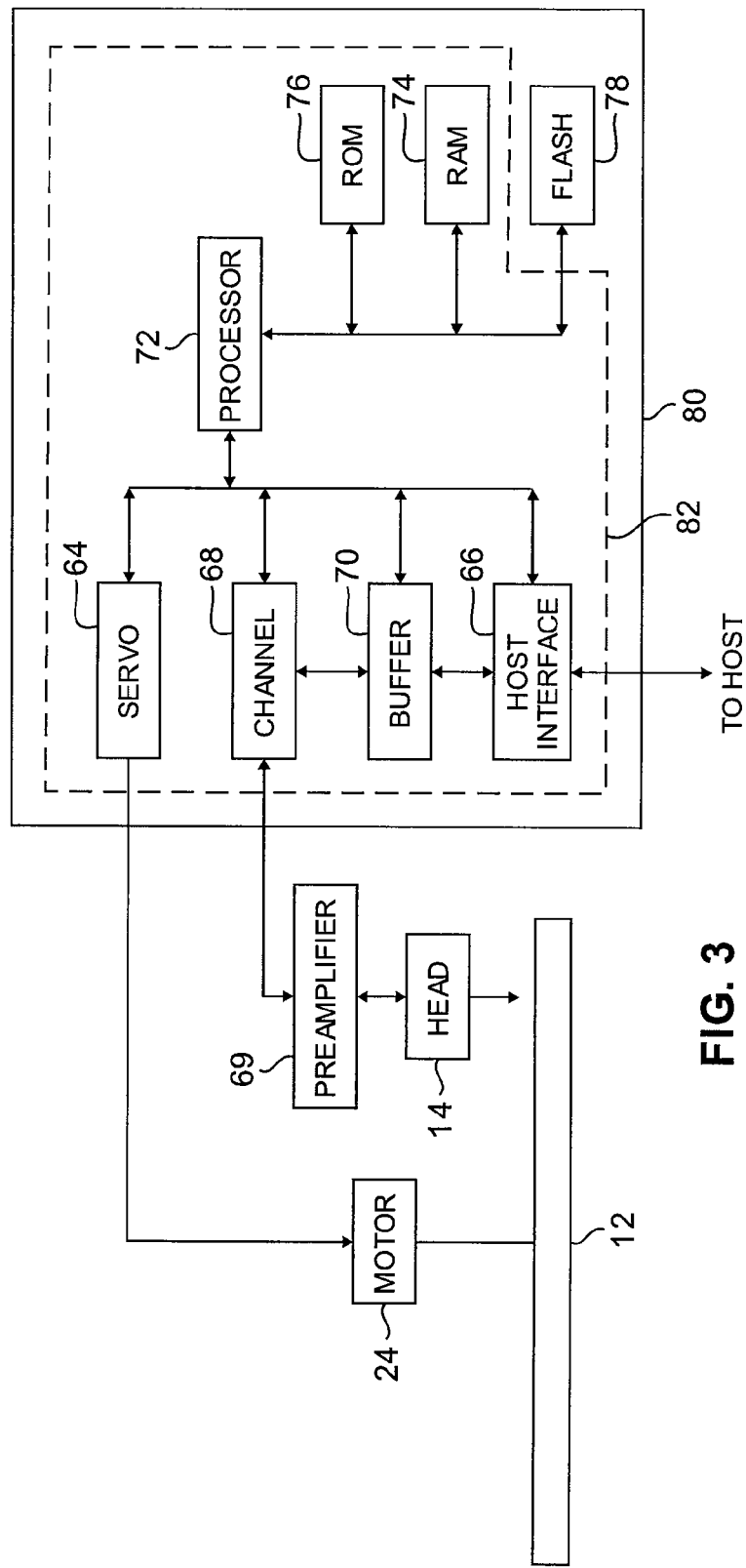
FIG. 3 is a partial schematic and partial block diagram of a prior art disk drive data storage system typically found in a consumer electronics product.

When a track such as the track 154 is accessed for reading or writing user data, prior to executing the read or write operation the defect list stored in the track defect field 150 is read and stored in the memory buffer 70 of FIG. 2 or 3. The defect list includes a list of the defective sectors on the track and also information (e.g., a slip count, a cumulative slip count of previous defects, an offset, a reallocation location) for determining the physical track and/or sector location of any data that has been moved due to a defect at the intended sector storage location.

During a write operation, the processor 72 of FIG. 2 or 3 uses the buffered track defect list to map the user data to a known-good sector physical data block address. According to one embodiment of the present invention, when a defective sector is identified user data is slipped to a next non-defective sector on the track, creating an offset of one between the logical block address and the physical block address. The offset value for each sector on every track may be based on the number of defect-induced slips on previous sectors of the same track or may reflect defects on all sectors of all previous disk tracks. In lieu of slipping the physical data storage location, the user data to be stored to a defective sector can be reallocated to another sector (typically a sector identified as a spare sector) to avoid the defect.

When the processor later commands a read of data that has been slipped to another sector to avoid a defect, the track defect list identifies the sector as a defective one and the physical block address to logical block address conversion process adds the offset value to the physical block address. The disk drive then reads the data from the determined good sector. In a data reallocation system, during a read operation the track defect table identifies the sector where the stored data has been stored (reallocated) to avoid the defective sector.

Although the present invention has been described with reference to a track defect table that includes defect information for all sectors within the track, the teachings can also be applied to one or more regions, zones or cylinders of the disk. In such an embodiment the defect list includes the defect information for the corresponding region, zone or cylinder and the defect list is stored on the region, zone or cylinder of the disk. In yet another embodiment, the defect list can encompass multiple tracks, regions, zones or cylinders, with the list stored on one or more of the multiple tracks, regions, zones or cylinders.

In another embodiment, to reduce latency associated with storing a track defect list (or a region, zone or cylinder defect list) to the memory buffer whenever a track is read or written, the complete track defect table is stored in two or more spaced-apart sectors on the track. This technique reduces the time required for the disk head to access the track defect table and thus reduces the time required to read or write data from that track of the hard disk drive. In one embodiment, four identical track level defect lists are created for each track and stored in four sectors separated by about 90 rotational degrees.

Figure 6:
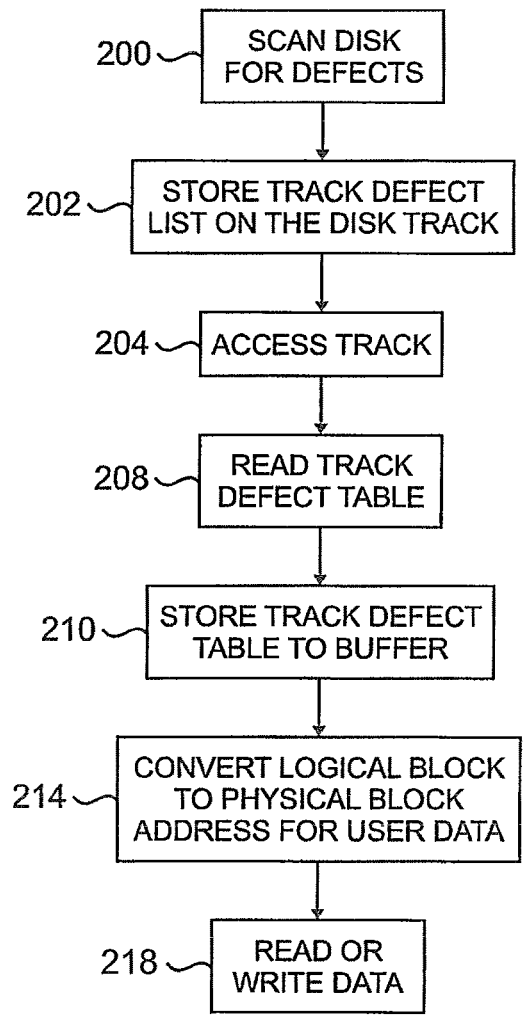
FIG. 6 is a flow chart illustrating a process for accessing the track defect list of the present invention.

FIG. 6 is a flow chart illustrating the process of accessing the track defect list of the present invention. At a step 200 a disk is scanned to determine the location of defective sectors. At a step 202 the defect list for each track is stored on the respective disk track. These steps are typically executed during the disk manufacturing process. When the disk drive is in operation, at a step 204 the disk is accessed to write or read user data to the disk. Prior to performing the read or write operation, at a step 208 the track defect list is read from the track where the user data will be read or written and the track defect list is stored to the buffer memory at a step 210. The logical address for the required read or write operation is converted to the physical address at a step 214. At a step 218 the user data is read or written to the determined physical address and any defective sectors on the track are avoided.

Since the track-level defect list is stored on the pertinent track of the disk 10, the prior art "system tracks" or "negative tracks" are freed for data storage. Also, the prior art process of pre-processing the global defect list to reduce execution time of the mapping algorithm is not required since the global defect list is replaced by the track defect list of the present invention.

Although the present invention has been described as applied to a disk drive data storage system, the teachings are also applicable to other data storage systems operative with different data storage media (not shown in the Figures) comprising, for example, a rigid magnetic disk, a flexible magnetic disk, magnetic tape, an optical disk and a magneto-optical disk.

An architecture and process have been described as useful for storing and utilizing a defect table for a disk drive data storage system. Specific applications and exemplary embodiments of the invention have been illustrated and discussed to provide a basis for practicing the invention in a variety of ways and in a variety of circuit structures and applications. Numerous variations are possible within the scope of the invention. Features and elements associated with one or more of the described embodiments are not to be construed as required elements for all embodiments. The invention is limited only by the claims that follow.

What is claimed is:

1. A method for reading or writing data to a disk of a disk drive data storage system, wherein defect information for an entire track of the disk is stored in the track to which the defect information pertains, the method comprising:
   accessing the track where the data is to be read or written;
   prior to reading or writing data to the track;
      reading the defect information of the entire track;
      storing the defect information of the entire track in a memory; and
   accessing the defect information of the entire track in the memory to determine a sector of the track for reading or writing the data.

2. The method of claim 1 further comprising after the step of accessing the track defect information, using the track defect information to convert a logical address of the data to a physical address representing the sector of the track for reading or writing the data.

3. The method of claim 1 wherein the defect information of the entire track is stored at a plurality of locations on the track.

4. The method of claim 1 wherein the track defect information occupies less storage space in the memory than defect information for the entire disk.

* * * * *